United States Patent Office 3,003,298
Patented Oct. 10, 1961

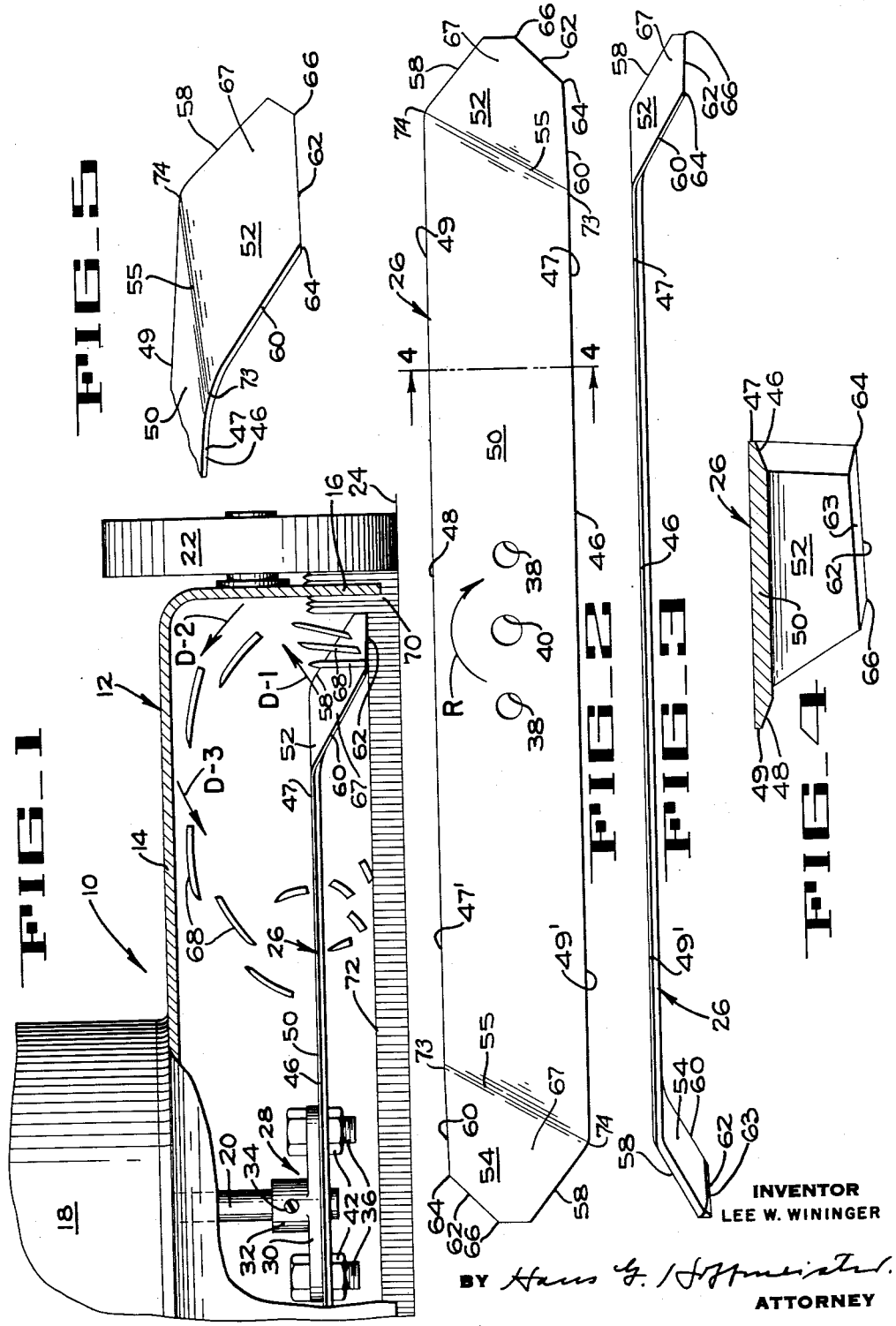

3,003,298
ROTARY MOWER BLADE
Lee W. Wininger, San Jose, Calif., assignor to FMC Corporation, a corporation of Delaware
Filed July 31, 1959, Ser. No. 830,949
3 Claims. (Cl. 56—25.4)

This invention relates to cutting blades and more particularly to cutting blades designed for use in lawnmowers of the rotary type.

Among the problems consistently confronting designers of rotary type lawnmowers is that of such poor distribution of the grass clippings mulched by the action of the mower that the mulched material deposited on the lawn must be subsequently raked, thereby not only requiring the expenditure of additional labor, but also losing nutrient and humus-forming values of the mulched material that otherwise would be beneficial to the lawn. Another problem is that of clogging of the mower housing. This latter problem has become accentuated with the trend to increased blade sizes, arbitrary mower styling and the effort to apply more lift action on grass that is not standing upright. Clogging which is the formation of deposits on the inner surfaces of the mower housing resulting from the compacting of grass clippings, contributes to imperfect cutting, engine stalling, starting difficulties, blade vibration, and offensive odor and corrosion of the mower housing when the compacted material is not removed.

Research into these problems revealed that clogging in the mower housing is primarily due to poor mulching action at the blade tip whereby long fibres and juicy pulp are extracted from the clippings, instead of the clippings being chopped or cut (mulched) cleanly. The sticky, long fibres resulting from poor mulching are hurled against the mower housing by the centrifugal air stream created by the action of rotary mower blades of common design and by the air lift action often incorporated into the blade construction to apply a lifting action on bent over grass blades to straighten them for even cutting. Adherence of the sticky fibres to the housing occurs principally in those regions where the material and the air stream in which it is entrained strike perpendicularly against the housing walls because the material cannot glance off the walls and because the moving air does not have as efficient a scouring action as does air striking obliquely against a surface.

In resolving the problems of poor mulching, clogging and improper distribution of the mulch during a grass cutting operation with a rotary mower, the design of the blade was considered to be the basic source at which the problems originated and where they could be best corrected. It was then postulated that in accordance with aerodynamic theory, mulching would be more cleanly and efficiently accomplished inboard of the high drag, high turbulence blade tip region where the grass is usually cut.

It is, therefore, an object of this invention to provide an improved cutter blade of the type used in rotary lawnmowers.

Another object is to provide a rotary lawnmower cutting blade having improved means for mulching the grass clippings cut thereby.

Another object is to provide a cutter blade arranged to throw the grass clippings in such directions that the clippings make glancing engagement with the housing walls, thus to reduce the tendency of the clippings to adhere thereto.

Another object is to so arrange the cutter blade that it creates an air current within the housing which impinges obliquely against the housing walls, particularly in those regions where most of the grass clippings are flung from the cutter blade.

Another object is to provide a cutter blade arranged to direct the clippings to the mulching region of the blade.

Another object is to provide a rotary mower cutter blade that minimizes clogging, i.e., the accumulation of mulched grass clippings on the inner surface of the mower housing.

Another object is to provide a rotary mower cutter blade adapted to efficiently mulch the grass clippings and to distribute them in a manner that avoids their being deposited in unsightly and harmful bunches or windrows on the surface of the cut lawn.

Another object is to provide a rotary mower blade that mulches the clippings and drives them through the clipped lawn onto the surface of the ground so that maximum benefit will be derived from their humus and nutrient values.

Other objects of this invention are to reduce hazards caused by the blade striking foreign objects such as pebbles and stones, to reduce blade deflection and stress due to the action of centrifugal force, to reduce the possibility of dulling and nicking of blade edges by striking loose foreign objects, and to keep the cost of manufacture at a minimum.

These and other objects and advantages of the present invention will become apparent from the following description and the accompanying drawings, in which:

FIG. 1 is a fragmentary front elevation of a rotary lawnmower with its housing partly broken away and shown in section to show the cutter blade embodying this invention used in connection therewith.

FIG. 2 is a top plan of the cutter blade of FIG. 1.

FIG. 3 is an enlarged front elevation thereof.

FIG. 4 is a section along line 4—4 of FIG. 2.

FIG. 5 is an enlarged, fragmentary isometric view of one end of the cutter blade of the invention.

With continued reference to the drawings, the numeral 10 designates a lawnmower of the rotary type shown fragmentarily in FIG. 1. The mower 10 includes a housing 12 having a roof portion 14 and a peripheral skirt 16 depending downwardly therefrom. The depending peripheral skirt 16 completely surrounds the housing 12 and is of the general character illustrated in connection with the rotary mower of U.S. Patent No. 2,718,739 to Long, issued September 27, 1955. A motor 18 is carried on the roof portion 14 with its vertical drive shaft 20 projecting into the housing 12. A plurality of wheels 22 (only one wheel being shown) are rotatably mounted on the skirt 16 to support the housing above a ground surface 24 for movement of the mower thereacross.

A cutter blade 26 constructed in accordance with the present invention is mounted at its mid-point on the drive shaft 20 for rotation thereby within the housing 12 in a horizontal plane adjacent the lower edge of the skirt 16. The cutter blade 26 is secured to the drive shaft 20 by a drive connector assembly 28 fixedly carried by the shaft adjacent its lower end (FIG. 1). The assembly 28 has a horizontally disposed, elongate body portion 30 and an upstanding collar 32 carried centrally thereon. The shaft 20 extends vertically through a suitable bore (not shown) centrally through the collar 32 and through the body portion 30 and is secured therein by a set-screw 34. Adjacent each of its ends, the body portion 30 carries a mounting stud 36 adapted to extend through respective registering drive holes 38 (FIG. 2) in the cutter blade 26 when the blade is positioned with the shaft 20 projecting through a mounting hole 40 in the blade at its mid-point. The assembly 28 is rigidly secured to the blade 26 by nuts 42 threaded onto the lower ends of the mounting studs 36 and tightened against the blade 26.

The cutter blade 26 is formed from a single piece of metal having a preformed cross-sectional configuration substantially in the shape of an inverted trapezoid (FIG. 4) and provided with longitudinal edges 46 and 48 along the under side of the main body portion of the blade (FIGS. 2 and 3). At the opposite ends of the body portion, there are provided outer end portions 52 and 54 which are canted downward out of the horizontal plane of the main body portion 50 (FIGS. 3 and 5). The two end portions 52 and 54 are similarly, but oppositely, shaped so that the blade 26 is radially symmetrical about its central vertical axis. The line 55 about which each of the end portions 52 and 54 is bent downward extends obliquely from a point 73 on the associated leading edge 47 or 47' that is spaced radially inward from the end of the blade, to a point 74 on the trailing edge 49 or 49' closer to the respective end of the blade. Thus the end of line 55 at point 73 is closer to the axis of rotation of the blade 26 than is trailing edge point 74 on the line 55. Consequently, the slope of each end portion is downward, outward toward the end of the blade, and forward with regard to the direction in which the end portion moves when the blade 20 rotates.

The normal direction of rotation of the cutter blade 26 is clockwise as viewed in FIG. 2 as indicated by the arrow R of figure. When the blade 26 is rotated in the indicated direction, that portion of its one longitudinal edge 46 which is disposed to one side of the mid-point of the blade (the right hand side as viewed in FIGS. 1, 2 and 3) becomes a leading edge 47 and that portion of the opposite longitudinal blade edge 48 extending to the same side of the mid-point of the blade becomes a trailing edge 49. Since the blade 26 is radially symmetrical about its central vertical axis, leading and trailing edges 47' and 49', respectively, defined by those portions of the longitudinal edges 46 and 48 which extend to the opposite side of the blade mid-point will, of course, be reversed in relation to leading and trailing edges 47 and 49, respectively. The leading edges 47, 47', being chamfered, serve as mulching blades, as will presently appear, while the scarfing of the trailing edges 49, 49' provides a certain amount of streamlining when the blade is in rotation to diminish air turbulence and contribute to quieter, smoother operation of the mower by reducing turbulence at the trailing edge of the blade.

Each trailing edge 49, 49' of the blade is beveled off at the end of the blade along a line 58, which intersects the trailing edge at or adjacent the trailing end of the associated bend line 55. The leading edge portion 60 of each of the end portions 52, 54 is a downwardly sloping portion that is a continuation of the leading edge 47 or 47', as the case may be. The outboard portion of each end portion 52, 54 is formed as a terminal cutting edge 62 that is raked or canted to form an obtuse angle with the associated leading edge portion 60 (FIG. 2). Each canted cutting edge 62 is beveled on its underside, as at 63 (FIG. 4), to provide a keen cutting edge. Each canted cutting edge 62 is relieved with a slight downward slope (FIGS. 3, 4, and 5) from its radially inner end 64, the point of juncture of the cutting edge 62 with the associated leading edge portion 60, to its outer tip end 66, so that tip end 66 is slightly lower than the inner end 64 (FIGS. 1 and 3). This slope is not large, however, so that as seen FIG. 1, the cutting edge 62 is almost parallel to the ground. It will be noted in FIGS. 2, 3, and 5 that the cutting edge 62 forms an acute angle with the bend line, the vertex of the acute angle being on the leading edge side of the blade. It is this acute angle that produces the relief or downward slope of the cutting edge 62 just described. This prevents bruising of the previously cut tips of grass stalks as the cutting edges 62 pass over cut grass stalks a second time. Furthermore, if the blade straightens out somewhat due to centrifugal force, the downward slope or relief of cutting edge 62 is merely partially removed, so that although the cutting edge 62 is brought more nearly parallel to the ground the tip end 66 is not raised higher than the juncture point 64.

With the cutter blade 26 mounted on shaft 20, the cutting edge 62 at the lowermost extremity of each outer end portion 52 and 54 is disposed below the horizontal plane of the main body plane 50 of the blade (FIGS. 1 and 3) so that, in operation, the hazard of striking the mounting studs or bolts 36 against an obstacle and thereby bending the motor drive shaft 20 is substantially reduced.

It has been recognized that there exists in a rotary mower blade having portions offset from the general plane of the blade, a tendency of the blade to straighten out when the blade is rotated at normal operating speed. This tendency is caused by a moment of torque developed by the centrifugal force generated during the rotation of the blade. The magnitude of the moment of torque thus created is proportional to the mass of the offset portion with relation to the total mass of the blade.

In a conventional mower blade of the type having a downwardly bent offset portion adjacent its center, it has been noted that when the blade is rotating at full speed the outer ends of the blade rise as much as three-eighths inch from their initial horizontal plane. Elevation of the ends of a cutter blade is an undesirable condition because it affects the cutting height of the mower and changes the angle of the cutting portion of the blade with relation to the stalk of grass to be cut. Furthermore, due to manufacturing variations in forming the offset portions dynamic imbalance of the blade is apt to develop when the blade thus flexes in response to centrifugal force, to the extent of causing undesirable, and even dangerous, vibration. With the foregoing considerations in mind, the blade 26 is designed with the mass of the offset end portions 52 and 54 kept small in relation to the total mass of the blade to thereby minimize the tendency of the blade to straighten out and thus move out of its preset horizontal plane of rotation under the influence of the centrifugal force generated during operation. Also, since the mass of each of the offset portions 52 and 54 is small as compared to the total mass of the blade, the effects of any variation in manufacturing processes in forming the blade are held at a minimum.

As already mentioned, the bevel 63 of each cutting edge 62 is formed entirely on the underside of the respective end portion 52 or 54. One advantage of this arrangement is that the bevel surface 63 extends straight back from the cutting edge 62 in a plane only slightly displaced from the horizontal, with the result that as the cutting edge wears away, practically all of the abrading will take place on the forwardly facing inclined attack surface 67. This leaves the plane in which the bevel surface 63 meets the cutting edge 62 substantially unaltered, with the result that dulling of the cutting edge as a consequence of normal blade wear is minimized.

Another advantage deriving from the fact that the bevel 63 defining each end edge 62 is formed entirely on the underside of the respective end portion 52 or 54 is that the inclined attack surface 67 remains uninterruptedly smooth. This makes for better aerodynamic efficiency in creating an air blast as a consequence of the oblique position of the end portion 52, 54 with regard to its direction of advance during blade rotation. The uninterruptedly smooth character of the inclined attack surface 67 likewise contributes to the control which the rotating blade maintains over the direction in which clippings 68 are caused to glance off the inclined attack surface 67, so that the trajectory in which the clippings are hurled off the blade substantially conforms to the general direction of the air blast created by the rotating end portions 52, 54. The angle of the end portions 52, 54 relative to the skirt of the housing is such that perpendicular lines drawn from the end portions of the blade intersect the housing skirt.

The particular direction in which each inclined attack surface 67 slopes with regard to the direction of its advance during blade rotation causes the air blast created by blade rotation, as well as the trajectory of the hurled clippings, to be in an upward and radially outward direction, as indicated by the arrow D–1 of FIG. 1. Consequently, the clippings impinge obliquely against the inner surface of the skirt 16, causing them to glance off that surface in an upward and radially inward direction, as indicated by the arrow D–2 of FIG. 1. Thus, they are directed against the undersurface of the roof 14 of the housing in an oblique direction, again glancing off so that they proceed radially inward, but now in a downward direction, as indicated by the arrow D–3 of FIG. 1 so that they enter the zone of operation of the leading edges 47 and 47'.

Thus the clippings are, in general, prevented from being hurled perpendicularly against any of the interior surfaces of the housing 12. This greatly reduces the tendency for the clippings to adhere to and thus to accumulate on, the inner surfaces of the housing. Furthermore, since the air blast from the end portions 52 and 54 likewise impinges obliquely, rather than perpendicularly, against the housing surfaces, it has a scouring action that is quite effective in dislodging material that otherwise would accumulate on those surfaces.

The blast of air within the housing 12, and the clippings entrained therein, follow a more or less circular path as a consequence of the blade rotation, in addition to the above explained upward, inward, and downward path, with the result that their path is substantially a spiral. Nevertheless, the speed at which the clippings circle around the axis of the rotor path is much less than the rotational speed of the leading mulching edges 47 and 47' of the rotating blade 20. Therefore, as the clippings are moved by gravity and by the downdraft approximately midway between the skirt 16 and the rotor shaft 20, the mulching portions of leading edges 47 and 47' strike the pieces of grass with sufficient force to sever them cleanly instead of bruising the clippings and reducing them to fibres and pulp, thereby eliminating a major cause of bunching of the mulched material upon the cut lawn.

After being thus acted upon by the mulching portions of leading edges 47 and 47', the mulched material is still entrained in the downdraft, which is effective to carry the material downward into the lawn between the upstanding, uncut parts 72 (FIG. 1) of the grass blades, where the mulched material will not mar the appearance of the lawn and will more readily form a moisture-preserving mulch and, eventually, rot down into fertilizer.

The cutting edges 62, by virtue of their raked, or angular disposition with respect to their direction of movement against the standing grass blades, not only develop a more efficient slicing cut, so that the grass blades are cut cleanly and with minimum crushing or tearing, but they also remain sharp longer because loose foreign objects such as pebbles, stones, sand, etc., which may be hit by the cutting edges will be struck with a glancing blow of considerably less force than if they were hit straight on by the cutting edges. Another advantage derived from the reduced force with which objects are hit by the cutting edges 62 is that the objects will be deflected off the cutting edges 62 with a lesser velocity than were they hit straight on, thereby reducing the hazard of injury to persons and property by such deflected objects being thrown out from the mower.

The updraft of air within the housing adjacent the inner surface of the skirt 16 tends to apply a lifting action to the blades of grass to be cut so that bent blades will tend to be straightened up prior to being cut to thereby produce a more evenly cut lawn.

In the operation of the mower 10 the blade 26 rotates in a horizontal plane within the housing 12 (FIG. 1). The cutting edges 62 at opposite ends of the blade will sever the grass, and the severed grass clippings are thrown up and radially outward, as is likewise the current of air generated by the rotating inclined attack surfaces 67. Thus, the clippings glance off the inner surface of the skirt 16, then off the undersurface of the housing roof 14, whence they pass through the mulching zone of the blade. Here the clippings are chopped cleanly into relatively small pieces by the leading edges 47 and 47', after which the relatively fine material is blown down into the lawn to form humus and, finally, fertilizer. Both the direction in which the clippings impinge against the housing walls and the scouring action of the air stream contribute to the decreased tendency for the mower to become clogged with an accumulation of compacted clippings therewithin. The canted disposition of the cutting edges 62, as well as their ability to remain efficiently sharp which results partly from the bevels 63 that define them lying on the underside of the blade, causes the cutting edges 62 to cut with a minimum of mashing of the grass.

While a particular embodiment of the present invention has been shown and described, it will be understood that the device is capable of modification and variation without departing from the principles of the invention and that the scope of the invention should be limited only by the scope and proper interpretation of the claims appended hereto.

The invention having thus been described, that which is believed to be new and desired to be protected by Letters Patent is:

1. A rotary lawn mower comprising a housing having a roof provided with a depending peripheral skirt extending therearound and a rotatable drive shaft projecting downwardly from said roof, a cutter blade secured to said shaft within the housing for rotation in a horizontal plane and comprising a substantially straight main body portion extending radially from said shaft, said main body portion having a trailing edge and a leading edge chamfered to form a mulching cutter, said blade having an outer end portion bent downwardly from said main body portion along a line extending between said leading and trailing edges, the point of intersection of said line with said leading edge being closer to the axis of rotation of said blade than the point of intersection of said line with said trailing edge, said downwardly bent end portion having a leading edge forming a continuation of the leading edge of said mulching cutter, a sharpened cutting edge disposed at the lowermost extremity of said end portion adjacent the leading edge thereof and obliquely angled rearwardly therefrom, the upper face of said end portion defining an attack surface disposed at an acute angle to said housing skirt, whereby clippings severed by said sharpened edge initially glancingly engage said attack surface, thence are directed obliquely against said skirt, are thereafter deflected from said skirt to impinge obliquely against said roof and then deflected downwardly from the roof for re-severance by said mulching cutter.

2. The rotary lawn mower construction of claim 1 wherein the attack surface of said end portion is smooth to minimize turbulence of air currents and wherein the acute angle between said attack surface and said skirt is such that lines drawn perpendicularly to substantially all points on said attack surface intersect said skirt at an acute angle.

3. The rotary lawn mower of claim 1 wherein said cutting edge is beveled upwardly and rearwardly on its under surface to provide a keen self-sharpening cutting edge.

References Cited in the file of this patent

UNITED STATES PATENTS

| 2,592,755 | Soenksen | Apr. 15, 1952 |
| 2,664,685 | Phelps | Jan. 5, 1954 |
| 2,721,438 | O'Maley | Oct. 25, 1955 |
| 2,857,728 | Smith et al. | Oct. 28, 1958 |
| 2,857,729 | Zoldok | Oct. 28, 1958 |
| 2,877,619 | Benson et al. | Mar. 17, 1959 |